Patented June 7, 1927.

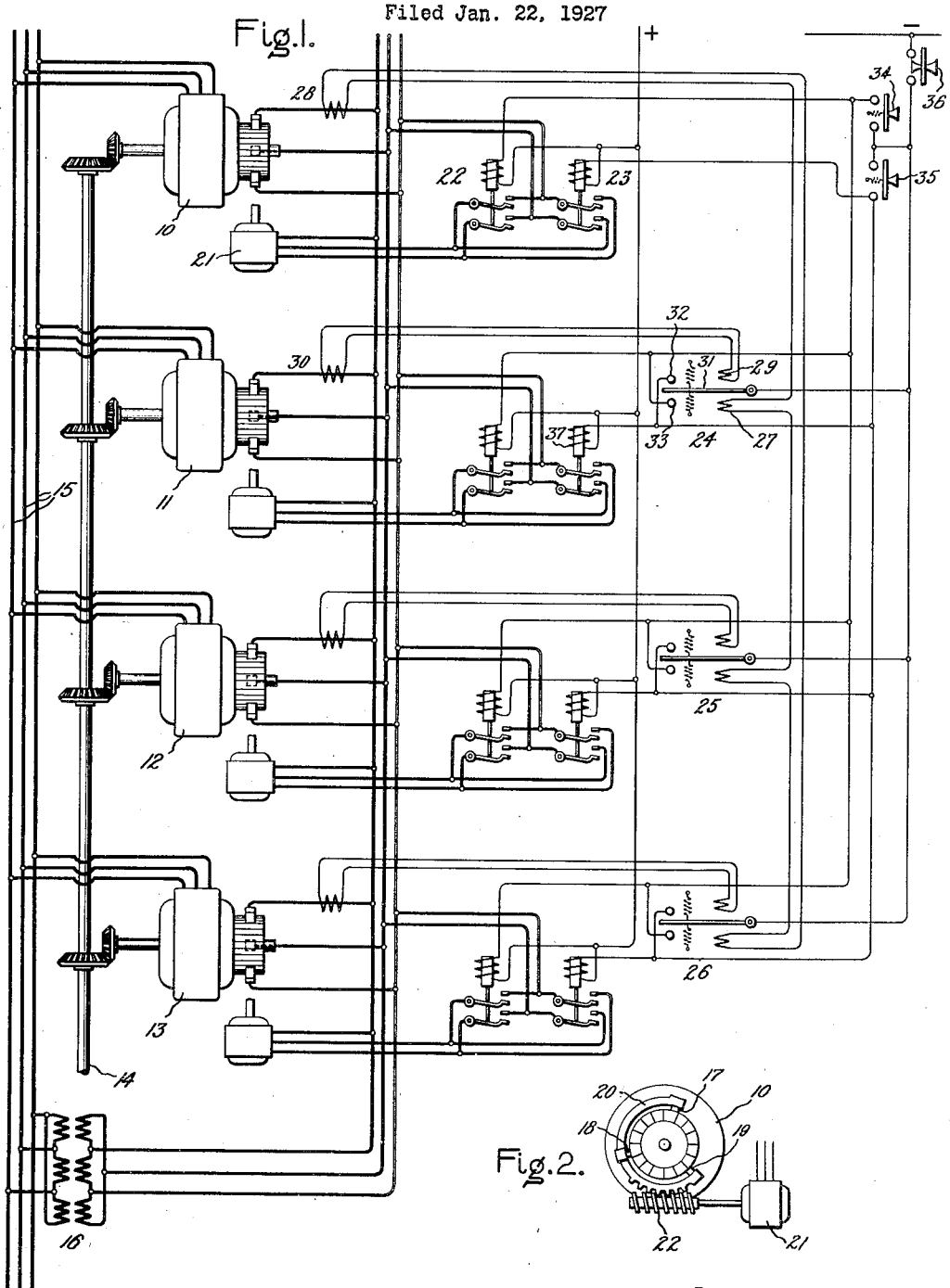

1,631,752

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

AUTOMATIC LOAD EQUALIZATION.

Application filed January 22, 1927. Serial No. 162,881.

In some applications of electric motors for the driving of various loads, it sometimes happens that several motors of various sizes are required to be connected for simultaneously driving the machine or other load. An instance of this is had in the driving of printing presses. A condition is also presented that there be some means whereby the speeds of the motors may be varied to meet the conditions imposed by the output. Where a plurality of motors are mechanically connected to drive a common load, difficulties arise due to the fact that a portion of the motors ordinarily tend to assume the entire load, thus overloading this portion and causing attending difficulties. This undesirable distribution of the load between the respective motors is particularly noticeable where motors of various sizes and speed ratings are connected to drive a common load.

My invention is directed to improvements in the means whereby a desirable distribution of load between the respective motors is automatically maintained, provision being made whereby the speeds of the motors may be varied within reasonable limits at the will of the operator and the predetermined load distribution between the motors automatically maintained.

In carrying my invention into effect in the form which I now regard as the preferred form thereof, I cause one motor to serve as a master motor and I provide each of the other motors with an electroresponsive device which operates as a function of the difference between the load on its associated motor and the load on the master motor. The various electroresponsive devices are connected to automatically regulate load adjusting mechanism for the associated main driving motor. In the embodiment of the invention which I have selected for illustrating the principles thereof and which is shown in the accompanying drawing, the electroresponsive devices take the form of relays which control speed adjusting mechanism for the associated driving motor so as to thereby automatically maintain load distribution between the respective motors. Each of the relays is provided with a switch member which is normally biased to a neutral position and which is operated from the neutral position to other positions, depending upon the difference in the load on the master motor and the driving motor with which the relay is associated. The relay switch member is connected to automatically control the speed adjusting mechanism for the associated driving motor.

Referring to the accompanying drawing, Fig. 1 shows diagrammatically a system of control for electric motors in accordance with the invention and Fig. 2 is a detail showing the mechanism for adjusting the brushes of the main driving motors by means of a pilot motor operating brush shifting mechanism through worm gearing.

Referring to Fig. 1, the driving motors 10, 11, 12 and 13 are indicated as of the alternating current commutator type, each of which has a rotor connected to the shaft 14 which drives the common load. The motors are connected to this shaft in any suitable way, as for example by means of the bevel gearing shown. The motors 10 to 13, inclusive, have their stator windings connected to the three phase source of supply 15 and the brushes of these motors are connected to the source 15 through the step-down transformer 16 which supplies a reduced potential to the armature circuit of the motors through the motor brushes and commutators. I have not indicated the mechanism whereby the motors 10 to 13 inclusive are connected to the source of supply 15 and the mechanism whereby the acceleration of these motors is controlled, since arrangements of this sort are of themselves quite old and well understood by those skilled in the art.

The motor 10 is indicated as the master motor, although I would have it understood that any one of the motors may serve as the master motor, this motor being selected merely for the sake of explaining the principles of the invention. The adjustment of the load distribution between the respective motors is had by adjusting the positions of the commutator brushes of the motors on the motor commutators. In Fig. 2 there is shown a detail of this brush shifting mechanism. It will be seen that the brushes 17, 18 and 19 are carried by a yoke 20 which has gear teeth cut thereon and the pilot motor 21 drives the worm 22 to rotate the brushes either clockwise or counter-clockwise about the commutator of the driving motor as required for the purpose of adjusting the load on this driving motor. It will be understood that the motors 10, 11, 12 and 13 are such that shifting the brushes about the commutators would tend to effect a speed variation of these motors and the driven load, but since the motors are all connected to a common load, the brush shifting mechanism is effective to also cause a variation in the load taken by a particular motor.

The pilot motors associated with the respective driving motors are controlled by means including reversing switch mechanism, for instance, the pilot motor 21 associated with the master motor 10 is governed by means of the reversing contactors 22 and 23, the contactor 22 being provided for controlling the pilot motor 21 to effect speed increase of the master motor 10 or an increase of the load taken by this motor and the contactor 23 being provided for effecting reverse operation of the pilot motor 21 to reduce the speed of the motor 10. It will be understood that while I have not indicated the same, these contactors will be suitably interconnected so that only one may be closed at a time. Since arrangements of this sort are common and well known, I have not indicated the same in the drawing.

The electromagnetic relay 24 associated with the pilot motor of driving motor 11, and the similar relays 25 and 26 associated with the pilot motors of the driving motors 12 and 13, respectively, are provided for automatically controlling the operation of their associated pilot motors so as to effect the maintenance of a predetermined distribution of the load between the driving motors. Each of these relays has one coil which is energized in accordance with the load on the master driving motor 10 and another coil which is energized in accordance with the load on the associated driving motor. For instance, the relay 24 has one coil 27 which is energized from the secondary of the current transformer 28 included in the rotor circuit of the master motor 10 and thereby is responsive to the load on motor 10. The relay is also provided with a second controlling coil 29 which is energized from the secondary of a current transformer 30 included in the rotor circuit of driving motor 11 and thereby is responsive to the load on this driving motor. The relay 24 is provided with a switch member 31 which is biased to a neutral position between the two contacts 32 and 33. The arrangement is such that the relay 24 governs the reversing contactors of the pilot motor associated with driving motor 11 so as to cause the load on driving motor 11 to be automatically regulated to vary the predetermined relation with respect to the load on driving motor 10. The push buttons 34 and 35 are provided for giving a manual control of the various reversing contactors for the pilot motors and the push button 36 is what is known as safe run-stop push button.

As thus constructed and arranged and with the parts in their respective positions as indicated in the drawings, the operation of my invention is as follows: Assume that the driving motors 10 to 13 are driving the load represented by the shaft 14 and that it is desired to increase the speed of the driven load. The push button 36 will first be closed and this push button is of the type that will remain closed until manually opened. The push button 34 is indicated as of the spring return type which maintains its contacts as long as the push button is held depressed. In case the push button 34 is pressed into engagement with its contacts, the directional contactors for the pilot motors, corresponding to the directional contactor 22 for the pilot motor 21, will all be closed and the brushes of the driving motors will be shifted so as to effect an increase in the speed of the driven load. This movement of the respective brushes of the driving motors will all be in the same direction. It is entirely likely that the predetermined distribution of load between the driving motors will not be maintained during this increase in the speed of the driven load, and accordingly there will be a necessity for an automatic distribution of the load to restore the predetermined relation. This will occur when the push button 34 is released. The directional contactor for the pilot motor 21 will be deenergized and the pilot motor 21 will stop, thereby causing the speed of the driving motor 10 to remain as determined by the operator. The relays 24, 25 and 26 will now function to restore the predetermined distribution of load between the driving motors. Thus, in case the load on the motor 11 is greater than it should be for the predetermined distribution of the load between the motors, the directional contactor 37 will be automatically energized through the switch member 31 of relay 24, because of the fact that the coil 29 of this relay predominates over the coil 27. The pilot motor of motor 11 will thus be energized to shift the brushes of this motor in such a direction as to reduce the load on this motor to the predetermined relation with respect to the motor 10. It will also be understood that the relays 25 and 26 also operate to automatically restore the predetermined distribution of the load between their respective driving motors 12 and 13, in a similar manner.

If for any reason the predetermined distribution of the load is not maintained, the relays 24, 25 and 26 operating in the manner above referred to, will correct the load distribution to restore the distribution as originally determined upon. In order to reduce the speed of the driven load, the push button 35 will be temporarily closed, and thus energize the pilot motor directional contactors corresponding to contactor 23. A result similar to that explained in connection with the increase in the speeds of the motors is brought about through the operation of the relays 24, 25 and 26 to automatically restore the predetermined distribution of the load between the respective driving motors.

What I claim as new and desire to secure by Letters Patent of the United States, is:

1. In a system for maintaining a predetermined distribution of load between a plurality of electric motors arranged to drive a common load, load adjusting means for each of a plurality of said motors, and an electroresponsive device associated with each of said load adjusting means, each of said devices being connected to respond to the difference between the load on the motor controlled thereby and the load on another of said motors to effect load corrective operation of said adjusting means.

2. In a system for maintaining a predetermined distribution of the load between a plurality of electric motors arranged to drive a common load, load adjusting means for each of a plurality of said motors, and an electroresponsive relay associated with each of said load adjusting means, each of said relays having electroresponsive operating means connected to be energized responsively to the load on the motor controlled by the relay and the load on another of said motors, and a movable element for each of said relays automatically operated by said electroresponsive means responsively to the difference between said motor loads for effecting automatic load distribution corrective operation of the load adjusting means associated with the relay.

3. In a system for maintaining a predetermined distribution of the load between a plurality of electric motors arranged to drive a common load, separate speed and load adjusting mechanism for each of said motors, an electroresponsive device associated with each of a plurality of said mechanisms, each of said devices being connected to respond to the difference between the load on the motor controlled thereby and the load on another of said motors to effect selective operation of said mechanism to automatically adjust the distribution of the loads on the motors with reference to said other motor, and manually operable means for simultaneously controlling said adjusting mechanisms to simultaneously vary the speeds of said motors for a temporary period.

4. In a system for maintaining a predetermined distribution of the load between a plurality of electric motors connected to drive a common load, a plurality of alternating current motors of the type having commutators and brushes therefor, one of said motors serving as the master motor, a separate pilot motor for shifting the brushes of each of said motors, reversing switch mechanism for each of said pilot motors, a relay for each of said driving motors except said master motor, the said relays each having a winding energized responsively to the load on said master motor and a winding energized responsively to the load on the associated driving motor, each of said relays being connected to control the associated pilot motor reversing switch mechanism responsively to the difference between the load on said master motor and the load on the associated driving motor to effect operation of the associated pilot motor to automatically maintain the predetermined distribution of load between said driving motors.

In witness whereof, I have hereunto set my hand this 21st day of January, 1927.

WILBUR L. MERRILL.